(12) United States Patent
Prasad Chittimalla et al.

(10) Patent No.: US 12,528,519 B2
(45) Date of Patent: Jan. 20, 2026

(54) SYSTEMS AND METHODS FOR TRACTION

(71) Applicant: Transportation IP Holdings, LLC, Norwalk, CT (US)

(72) Inventors: Rajendra Prasad Chittimalla, Bengaluru (IN); Sakshi Narchail, Bengaluru (IN); Jeremy McGarry, Erie, PA (US); Abhijith Jain, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 1072 days.

(21) Appl. No.: 17/644,324

(22) Filed: Dec. 14, 2021

(65) Prior Publication Data
US 2023/0182785 A1 Jun. 15, 2023

(51) Int. Cl.
*B61C 15/08* (2006.01)
*B60B 39/02* (2006.01)
(Continued)

(52) U.S. Cl.
CPC ............ *B61C 15/085* (2013.01); *B60B 39/02* (2013.01); *B60B 39/021* (2013.01);
(Continued)

(58) Field of Classification Search
CPC ....... B61C 15/085; B61C 15/00; B61C 15/08; B60B 39/025; B60B 39/026; B60B 39/08;
(Continued)

(56) References Cited

U.S. PATENT DOCUMENTS 6,166,657 A * 12/2000 Mann ................... B60B 39/086
340/580
6,535,141 B1 * 3/2003 Doherty ................ E01H 10/007
340/580
(Continued)

FOREIGN PATENT DOCUMENTS

CN 103112470 A 5/2013
CN 104386096 A 3/2015
(Continued)

OTHER PUBLICATIONS

Eurasian Patent Office, Search Report Issued in Application 202292468, Feb. 15, 2023, 5 pages.
(Continued)

*Primary Examiner* — S. Joseph Morano
*Assistant Examiner* — James William Jones
(74) *Attorney, Agent, or Firm* — K&L Gates LLP

(57) ABSTRACT

Methods and systems for operating a vehicle are provided. In one example, a method for operating a vehicle may include flowing compressed gas selectively through distinct orifice sizes depending on an operating condition of the vehicle. In another example, the vehicle may be a rail vehicle. In one example, the compressed gas may include compressed ambient air, and where the compressed gas is selectively delivered toward an upstream of a vehicle wheel riding on a rail via a nozzle. In another example, the compressed gas may be selectively delivered through a first orifice and not a second orifice to the nozzle during a first condition, and delivered through the second orifice and not the first orifice during a second condition different from the first condition.

20 Claims, 6 Drawing Sheets

(51) Int. Cl.
  *B60B 39/08* (2006.01)
  *B61C 15/00* (2006.01)
  *B61F 19/02* (2006.01)
(52) U.S. Cl.
  CPC .......... *B60B 39/025* (2013.01); *B60B 39/026* (2013.01); *B60B 39/08* (2013.01); *B60B 39/083* (2013.01); *B60B 39/086* (2013.01); *B61C 15/00* (2013.01); *B61C 15/08* (2013.01); *B61F 19/02* (2013.01)
(58) Field of Classification Search
  CPC ... B60B 39/083; B60B 39/086; B60B 39/021; B60B 39/02; B61F 19/02
  USPC ......................................................... 104/279
  See application file for complete search history.

(56) References Cited

U.S. PATENT DOCUMENTS

| | | | |
|---|---|---|---|
| 9,308,921 | B2 | 4/2016 | Worden et al. |
| 2013/0206862 | A1 | 8/2013 | Worden et al. |
| 2015/0051760 | A1* | 2/2015 | Worden ................. E01H 8/105 701/19 |
| 2017/0036681 | A1* | 2/2017 | Winston ................. B61C 15/08 |
| 2019/0322294 | A1* | 10/2019 | Worden ................. B61C 17/12 |
| 2021/0146966 | A1* | 5/2021 | Reich .................... B60B 39/021 |

FOREIGN PATENT DOCUMENTS

| | | | | |
|---|---|---|---|---|
| CN | 108116428 | A * | 6/2018 | ........... B61C 15/102 |
| CN | 209873688 | U * | 12/2019 | |
| DE | 202013000635 | U1 | 4/2013 | |
| EA | 201390047 | A1 | 7/2013 | |
| EP | 3768563 | B1 | 6/2021 | |
| GB | 2593764 | A * | 10/2021 | ............. B08B 13/00 |
| RU | 2252166 | C1 | 5/2002 | |
| WO | WO-2019219224 | A1 * | 11/2019 | ........... B60B 39/021 |

OTHER PUBLICATIONS

European Patent Office, Extended European Search Report Issued in Application No. 22200501.9, May 15, 2023, Germany, 9 pages.

* cited by examiner

SYSTEMS AND METHODS FOR TRACTION

TECHNICAL FIELD

Embodiments of the subject matter disclosed herein relate to vehicle operation.

DISCUSSION OF ART

Wheeled vehicles may rely on traction to propel themselves and to stop. As one example, rail vehicles have a plurality of wheels to move along a rail, or track. Rail vehicles may pull large loads, such as multiple loaded rail cars, over long lengths of tracks. To operate efficiently, the rail vehicle may try to operate with a maximum of tractive effort. However, tractive effort may be limited by the amount of contact friction between the wheels of the rail vehicle and the patch of rail over which the wheels are passing at any given moment. This amount of friction, in turn, depends such factors as the presence of contaminants (snow or ice, oil, mud, soil, etc.) on the rail or wheel, the shape (roundness) of the wheel, the shape of the rail, atmospheric temperature, humidity, and the normal force or weight imposed on an axle, among others.

It may be desirable to have a system and method that differs from those that are currently available.

BRIEF DESCRIPTION

In one embodiment, a method of operating a vehicle may include flowing compressed gas selectively through distinct orifice sizes depending on an operating condition of a vehicle.

In one embodiment, a method of operating a vehicle may include monitoring vehicle tractive effort to identify a reduced tractive effort that is below a threshold value; determining an operating condition of the vehicle; and responding to an identified reduced tractive effort by requesting Surface Cleaning in which compressed air is selectively directed through one or both of first and second orifice sizes toward a location on a route surface that is upstream of a vehicle wheel based at least in part on the determined operating condition of the vehicle.

In one embodiment, a system is provided that includes a compressed gas storage tank and a delivery system. The delivery system couples the storage tank to a nozzle. The delivery system includes a parallel path diverging downstream of the tank and converging upstream of the nozzle, the parallel path including a first path with a first orifice and first solenoid, and a second path including a second orifice and second solenoid.

DETAILED DESCRIPTION

Figure 1:
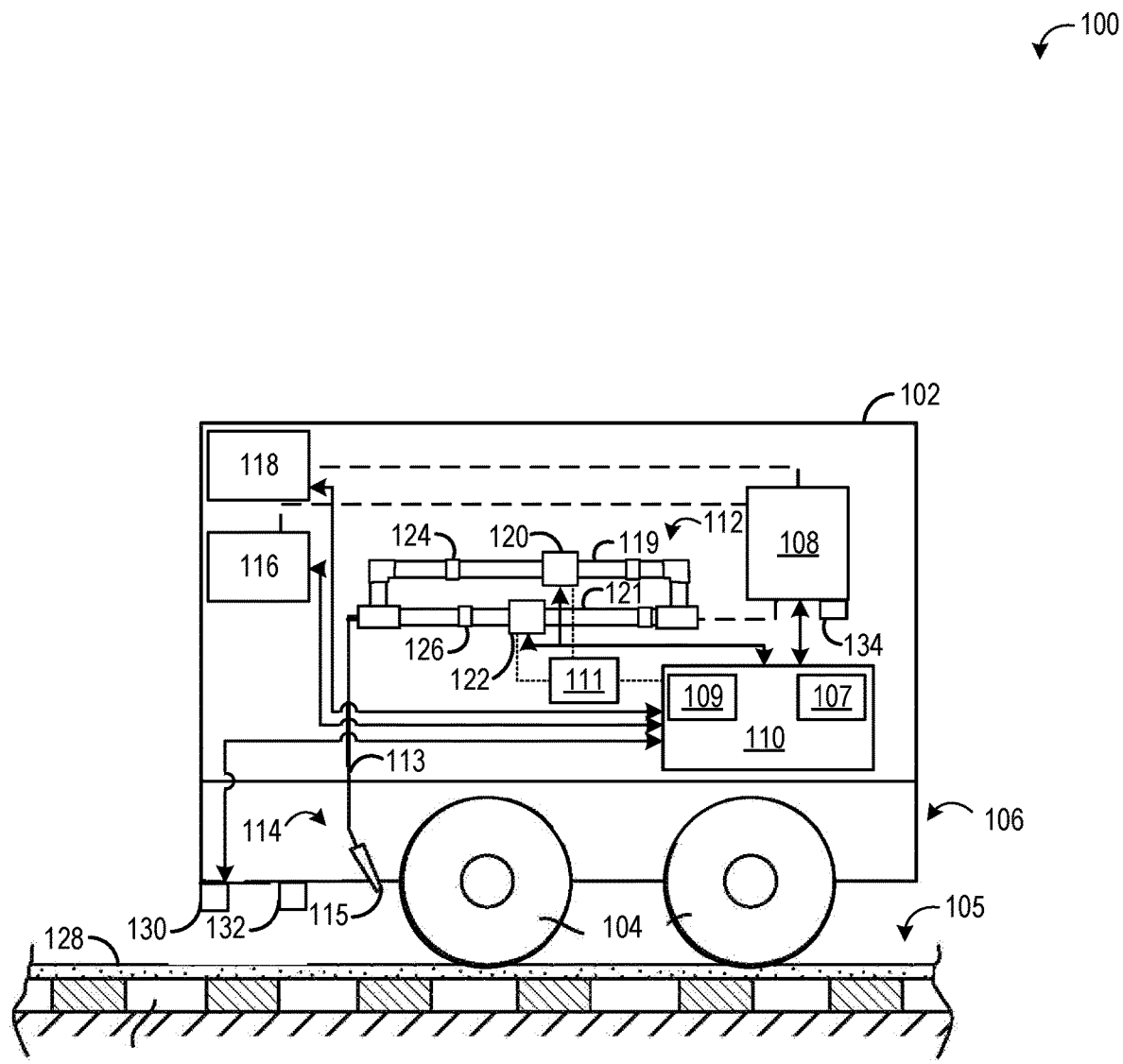
FIG. 1 is a schematic drawing of a vehicle system.

Embodiments of the invention are disclosed in the following description that may relate to a tractive effort system for a vehicle, where the tractive effort system modifies the traction of a wheel contacting a surface. Such a tractive effort system may be disposed in a vehicle. In one embodiment the vehicle is a rail vehicle, such as a locomotive, and the surface may be a surface of a rail. In another example, the vehicle may be an on-road vehicle such as an automobile, and the surface may be a surface of a road. The tractive effort system may include a nozzle coupled to an air source. The air source may be a compressed air tank or other suitable supply of pressurized or compressed air. The nozzle may direct an air stream toward edges of the surface (e.g., between an inner surface and an outer surface of a rail) and proximate to a wheel of the vehicle based on a detection of contaminants, e.g., snow, ice, water, oil. Aspects of the invention may enable on-demand, continuous use of an air stream for increasing tractive effort and adhesion benefit. In examples where an auxiliary main reservoir supplies compressed air to the tractive effort system, the supply of compressed air may be shut off in response to air pressure reducing in the main reservoir. Operating the tractive effort system may use significant air, and in examples where air pressure in the main reservoir reduces due to the use of the tractive effort system (e.g., a main reservoir of a single locomotive), on and off cycling of the tractive effort system may result. Such on and off cycling may be worsened by leakages in the vehicle system, such as leakages in an air brake system or other auxiliary systems of the vehicle that use compressed air from the main reservoir. In some examples, on and off cycling of the tractive effort system may result in reduced adhesive benefit. A tractive effort system and method that allows for the continuous use of an air stream of a compressed air source may reduce instances of interruption due to pressure loss or leakage in the system.

A technical effect for introducing continuous use control of a tractive effort system for a vehicle is providing more adhesion benefit on wet rail conditions to achieve desirable performance and reduce instances of tractive effort system interruption. In one example, a continuous flow tractive effort system may flow compressed gas selectively through distinct orifice sizes depending on an operating condition of the vehicle. In one example, distinct orifice sizes may include a first, larger orifice (e.g., a conduit) between the nozzle and the air source, such as a pipe, tube, or hose, that can supply compressed air during a first condition, and second, smaller orifice that can supply compressed air during a second condition. The continuous flow tractive effort system may include a first and second solenoid valve to selectively actuate the flow between first and second orifices sizes based on the operating condition.

In one example, compressed gas may be delivered through the first orifice and not the second orifice during a first condition. In another example, compressed gas may be delivered through the second orifice and not the first orifice during a second condition different from the first condition. In one example, the operating condition may include a pressure level of the compressed air storage tank, e.g., the main reservoir. In another example, the operating condition may include a leakage estimate of the compressed air storage tank. In another example, the operating condition may include a presence of debris, e.g., surface moisture, on the surface of travel. In this way, the continuous flow tractive effort system may provide a continuous stream of air in response to various operating conditions, including ambient conditions, increasing compressed air demand, reducing pressure, and/or compressed air leakage. The stream of air may be at sufficient velocity to dislodge water, ice, or other debris from the surface to increase traction. As used herein, the terms "air stream" and "stream of air" may refer to a supply of air from the tractive effort system to a surface that only includes air and does not include any additional added constituents such as sand or other abrasives. However, in some examples, the tractive effort system may include a separate sander to supply abrasives to the surface, while in other examples abrasives may be supplied along with the air stream.

The approach described herein may be employed in a variety of mobile platforms, such as engine-driven vehicles, electrically driven vehicles, or vehicles propelled according to another suitable mechanism. Such vehicles can include on-road transportation vehicles, as well as mining equipment, marine vessels, rail vehicles, and other off-highway vehicles (OHV). For clarity of illustration, a locomotive is provided as an example of a self-propelled vehicle and more broadly as an example of a mobile platform supporting a system incorporating an embodiment of the invention.

FIG. 1 shows an embodiment of a vehicle system 100. In the illustrated example, the vehicle system depicted is a locomotive or other rail vehicle. The locomotive or other rail vehicle shown in FIG. 1 comprises a superstructure 102 and a rail vehicle truck 106. The superstructure may be the body of the locomotive or other rail vehicle. The rail vehicle truck may include a frame and motor combos 104 mounted thereto that transport the locomotive or other rail vehicle along rails 105. As shown, the rail vehicle includes two motor combos.

In one example, a suitable rail vehicle may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is used as an example fuel, other fuels may be used. Suitable other fuels may include gasoline, kerosene, ethanol, biodiesel, natural gas, and combinations of the foregoing.

The rail vehicle may include an engine (not shown), such as an internal combustion engine. In an example, the engine may be a dual or multi-fuel engine. A multi-fuel compression engine may combust a mixture of gaseous fuel and air upon injection of diesel fuel during compression of the air-gaseous fuel mixture. In other embodiments, the engine may combust liquid fuels, such as gasoline, kerosene, biodiesel, ethanol, dimethyl ether (DME), or petroleum distillates of similar density through compression ignition (and/or spark ignition). In other embodiments, the gaseous fuel may be selected from natural gas, ammonia, hydrogen, and the like. In an example, the engine may be mechanically coupled to an alternator. For example, the engine may be a diesel engine that generates a torque output that is transmitted to the alternator. The alternator produces electrical power that may be stored and applied for subsequent propagation to a variety of downstream electrical components. As an example, the alternator may be electrically coupled to a plurality of traction motors and may provide electrical power to the plurality of traction motors. In some examples, the plurality of traction motors may be powered by an alternate source, such as via an on-board battery or fuel cell, overhead electric wires, etc.

Each motor combo may include plural train wheels. In some embodiments, each motor combo is a device or assembly (disposed or to be disposed in a rail vehicle truck) that includes a traction motor (not shown) and equipment (e.g., axle, wheels) used for interfacing the traction motor with the rails on which the vehicle travels, for moving the vehicle along the rails. The tractive effort of the plurality of wheels is dependent on the amount of friction that is generated between each vehicle wheel and the patch of rail with which the wheel is in contact. Various factors may affect the amount of friction generated, including contaminates present on the rail. In particular, adverse weather conditions may result in snow, ice, and/or water being present on the rail. Because these conditions may appear suddenly, and are particularly prone to occurring in mountainous regions where haulage ability is already limited by steep grades, rail vehicle operators may choose to avoid mountainous routes and/or limit the tonnage of the load being pulled, to avoid loss of traction.

In one embodiment, the rail vehicle may be equipped with tractive effort system 114 having a nozzle 115 pointed at the location of the rail where the wheel contacts the rail, just in front of the lead wheels of the rail vehicle. The nozzle may direct high-pressure air onto the rail, clearing the rail of snow, water, dirt, or other debris, thus increasing the friction between the rail and wheels. The Surface Cleaning system may direct the air to the rail upon request from an operator, or automatically in response to detection of debris on the rail, for example. The nozzle may be coupled to an air source 108 via a passage 113 (e.g., a conduit such as a pipe, hose, tube, or other conduit). In one example, the air source may be the main reservoir on board the locomotive or the MRE pneumatic trainline (wherein compressed gas may be supplied by one or more air compressors within the locomotive consist). The passage may be coupled to a suitable structure of the vehicle, such as to a support structure of a lead axle of the vehicle (e.g., to a journal bearing housing).

As explained above, the nozzle directs the air onto a surface 128 ahead of a wheel. The wheel may be on a lead axle. In one example, the surface may be a surface of a rail (also referred to as a track). In other examples, the surface may be a road, and the nozzle may be aimed toward a portion of the road surface (e.g., located in front of the wheel by a certain distance, in the center, near an edge of the road surface).

The passage may allow a flow of compressed gas, e.g., compressed air, from the main reservoir to the nozzle. The main reservoir may include compressed ambient air, such as from a compressed air tank of the vehicle, from downstream of intake air compressor of an engine, or other suitable source of compressed air. In an example, the compressor outflow may be 180 cubic feet per minute (CFM) and not vary as a function of main reservoir pressure. In some embodiments, the main reservoir may be in fluid communication with one or more parallel systems of the vehicle system. In an example, dashed lines indicate the compressed air supply from the main reservoir to the tractive effort system, air brake system 116 and one or more auxiliary system(s) 118 (e.g., horn, air dryer, sand valves).

In an example, the compressed air storage pressure in the main reservoir may lower or be reduced from use of a tractive effort system and one or more auxiliary systems as they draw from a compressed air supply. In an example, a threshold pressure may be calibrated for the main reservoir. For example, the threshold pressure may be calibrated to a brake pressure limit based on brake testing. In such an example, if main reservoir pressure falls below the threshold value, operation of the tractive effort system may be interrupted. In some examples, leakage in one or more parallel systems drawing compressed air from the main reservoir may contribute to pressure reduction. Such a tractive effort system may efficiently remove contaminates from the rail and increase tractive effort of the vehicle, but in some examples, it may encounter difficulty when the main reservoir pressure reduces below the threshold value due to increasing demand or system leakage. As a result, operation of the tractive effort system may be interrupted by periods of shut off, resulting in on and off cycling and contaminates not being removed from the rail. Thus, in one embodiment, a tractive effort system may be equipped with a delivery system that may supply compressed air to the nozzle continuously, on-demand, e.g., as needed based on an operating condition. In one example, the delivery system may be fluidically coupled to the supply of compressed air from the main reservoir. The delivery system may include a parallel path diverging downstream of the main reservoir and converging upstream of the nozzle. The delivery system, such as continuous flow system 112, may comprise a first path 119 parallel with a second path 121. The first path may include a first valve 120, such as a first solenoid valve, that actuates air flow to a first orifice 124. The first orifice directs a first, higher velocity, higher flow of air stream, to a contact surface of the rail via the nozzle coupled to the continuous flow system. The second pathway may include a second valve 122, such as a second solenoid valve, that actuates air flow to a second orifice 126. The second orifice directs a second, lower velocity, lower flow of air stream, to a contact surface of the rail via the nozzle coupled to the continuous flow system. In combination, the tractive effort system equipped with the continuous flow system form a continuous flow tractive effort system.

In one embodiment, the continuous flow tractive effort system may direct the stream of air to the surface of the rail upstream of a vehicle wheel upon request from an operator, or automatically in response to detection of debris on the rail or in response to detection of wheel slippage, for example. In one embodiment, the continuous flow tractive effort system may operate the first higher flow of air or the second lower flow of air to clean the rail based on one or more operating conditions of the vehicle system. In one example, the operating condition may include a pressure of the main reservoir. In another example, the operating condition may include an estimate of leakage in an air system, such as the air system including the main reservoir and parallel compressed air consuming systems.

In one example, the first and second solenoid valves may be energized from a voltage source 111 responsive to a signal from an electronic controller 110, for example. The electronic controller may include non-transitory instructions stored in memory 109 that when executed cause the controller to send a signal to activate the first or the second solenoid valve, e.g., the controller may activate a switch coupled between the voltage source and the valves. The instructions may include initiating activation of the tractive effort system when a debris is detected, when wheel slip is detected, responsive to a user request, and/or other suitable parameters. The instructions may further include actuating the first solenoid valve or the second solenoid valve based on the one or more operating conditions described above.

The electronic controller may receive input data from various sensors of the vehicle system, process the input data on a processor 107, and trigger various actuators in response to the processed input data based on instruction or code programmed therein corresponding to one or more methods. In one example, the electronic controller may receive input from one or more sensors 130 for detecting the debris of the surface. The one or more sensors may include optical sensor(s) or other suitable sensors that may detect debris. In another example, the vehicle system may include one or more sensors 132 for detecting wheel slippage. The output from the one or more sensors may be sent to the electronic controller, and the controller may determine operation of the continuous flow tractive effort system based on the sensor output. For example, the sensor output may be used by the controller to determine an on/off condition of the tractive effort system. The vehicle system may include one or more sensors 134 for determining compressed air storage pressure in the main reservoir. Output from the pressure sensor and/or flow sensor may be sent to the controller, and the controller may determine operation of the first solenoid valve or the second solenoid valve based on the compressed air storage pressure. Additional pressure and/or flow sensors may be included in the vehicle system for monitoring compressed air usage in the system and for detecting compressed air leakage. In one embodiment, a compressed air leakage amount may be estimated based on a real-time estimate determined from a model of compressed gas storage and usage in the vehicle and feedback from one or more sensors. In one embodiment, deviations from the model may indicate a compressed air leakage amount. In one example, the controller may determine operation of the first solenoid valve or the second solenoid valve based on the compressed air leakage amount, herein referred to as a leakage estimate.

Figure 2:
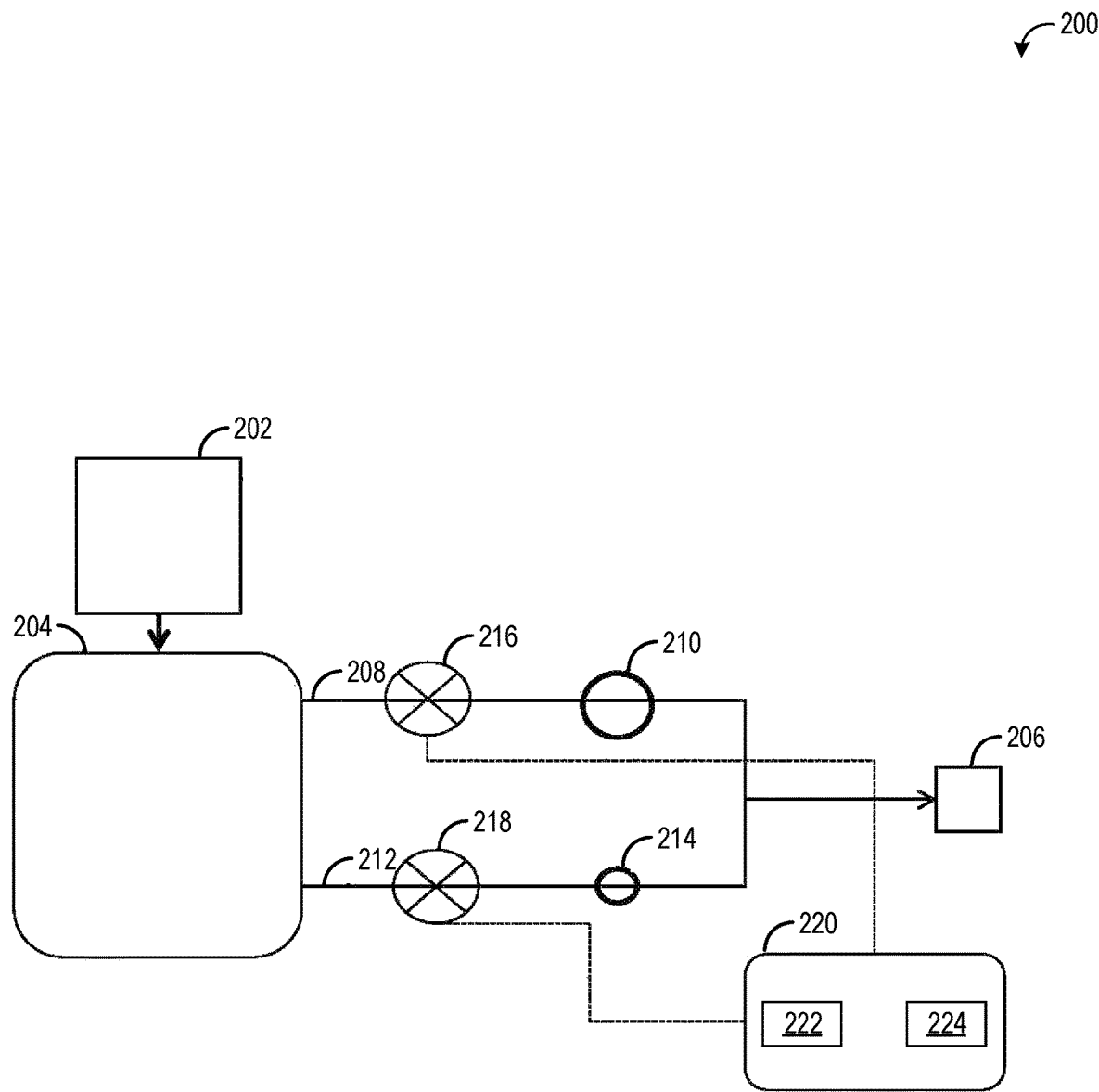
FIG. 2 is schematic drawing of a continuous flow tractive effort system.

With reference to FIG. 2, a schematic diagram of a continuous flow tractive effort system 200 in accordance with an embodiment of the present invention is shown. As described above, in some examples, the performance of a tractive effort system may be interrupted due to pressure loss in a compressed air reservoir, such as a main reservoir. A continuous flow tractive effort system, in some examples, may enable continuous Surface Cleaning functionality, as desired and/or as needed e.g., based on ambient weather conditions, to clean a surface, e.g., of a rail or road. In one embodiment, an air compressor 202 compresses air, which is stored in the main reservoir 204 on board a rail vehicle or locomotive. The main reservoir is in fluid communication with a tractive effort system 206, such as that described above, through a first pathway 208 having a large orifice 210 therein and a second pathway 212 having a small orifice 214 therein. A first valve 216, such as first solenoid valve, selectively controls the flow of compressed air through the first pathway and the large orifice to the tractive effort system and a second valve 218, such as second solenoid valve, selectively controls the flow of compressed air through the second pathway and the small orifice to the tractive effort system. An electronic controller 220 is electrically coupled to the first and second solenoid valves and may selectively control the first and second solenoid valves between a first state in which air is prevented from flowing through the second solenoid valve and compressed air flows through the first solenoid valve, through the first orifice, and to the tractive effort system, and a second state in which compressed air is prevented from flowing through the first solenoid valve and compressed air flows through the second solenoid valve, through the second orifice, and to the tractive effort system.

In one embodiment, the controller may detect pressure within the main reservoir with a pressure sensor 224 and control the flow of compressed air from the main reservoir through either the large orifice or the small orifice in dependence upon the detected pressure. If tractive effort is needed (or desired) and the pressure within the main reservoir is less than a determined threshold pressure value, the control unit may control the first and second solenoid valves to the second state in which air flows through the second solenoid valve and is prevented from flowing through the first solenoid valve such that a flow of compressed air through the small orifice only is permitted. A lower pressure in the main reservoir may be a result of other systems using the available supply of compressed air, air compressors operating at less than maximum capacity, or system leakage, etc. Constricting air flow to the smaller orifice allows the continued use of the continuous flow tractive effort system under lower pressure conditions of the main reservoir, and in some examples enables the compressor to load and the main reservoir pressure to increase. In another example, if the pressure within the main reservoir is above the threshold value, the controller may control the first and second solenoid valves to the first state in which air flows through the first solenoid valve and is prevented from flowing through the second solenoid valve such that compressed air is permitted to flow through the large orifice and is prevented from flowing through the small orifice. In some examples, operational control of the valves to the first position allows for maximum flow to the tractive effort system when main reservoir pressure is sufficiently high. Operational control of the valves to the second position allows for continued use of the tractive effort system when main reservoir pressure reduces, and thus on-demand Surface Cleaning may be achieved. The Surface Cleaning may be continuous, pulsed, periodic, as-needed, or the like.

In another embodiment, the controller may actively estimate a leakage rate of air in the system. By appropriate sizing of the compressor, in one example, the control unit may operate the continuous flow tractive effort system using the large orifice when air brakes and one or more of the parallel systems are drawing compressed air simultaneously. In such an example, the smaller orifice may only be needed if there is excessive leakage (e.g., due to cracks, loose fittings) in the system. In one embodiment, a model 222 of compressed gas storage and usage with inputs such as a status of the compressor (e.g., active, loading, inactive), a status of the one or more parallel (e.g., consumer) systems (e.g., active, inactive), and other inputs may estimate a compressed air leakage amount using feedback of the sensors in the system (e.g., pressure, flow). The controller may determine which orifice to use (e.g., an allowable amount of air flow) based on the estimate of leakage in the system. In one example, leakage estimation may reduce incidence of switching to the smaller orifice from the larger due to pressure reducing. In an example, the system may be more pro-active by estimating leakage during various operating conditions using the model, anticipating which orifice to use based on the condition and thus continuous use of a tractive effort system during high compressor demand and leakage scenarios may be achieved.

Figure 3:
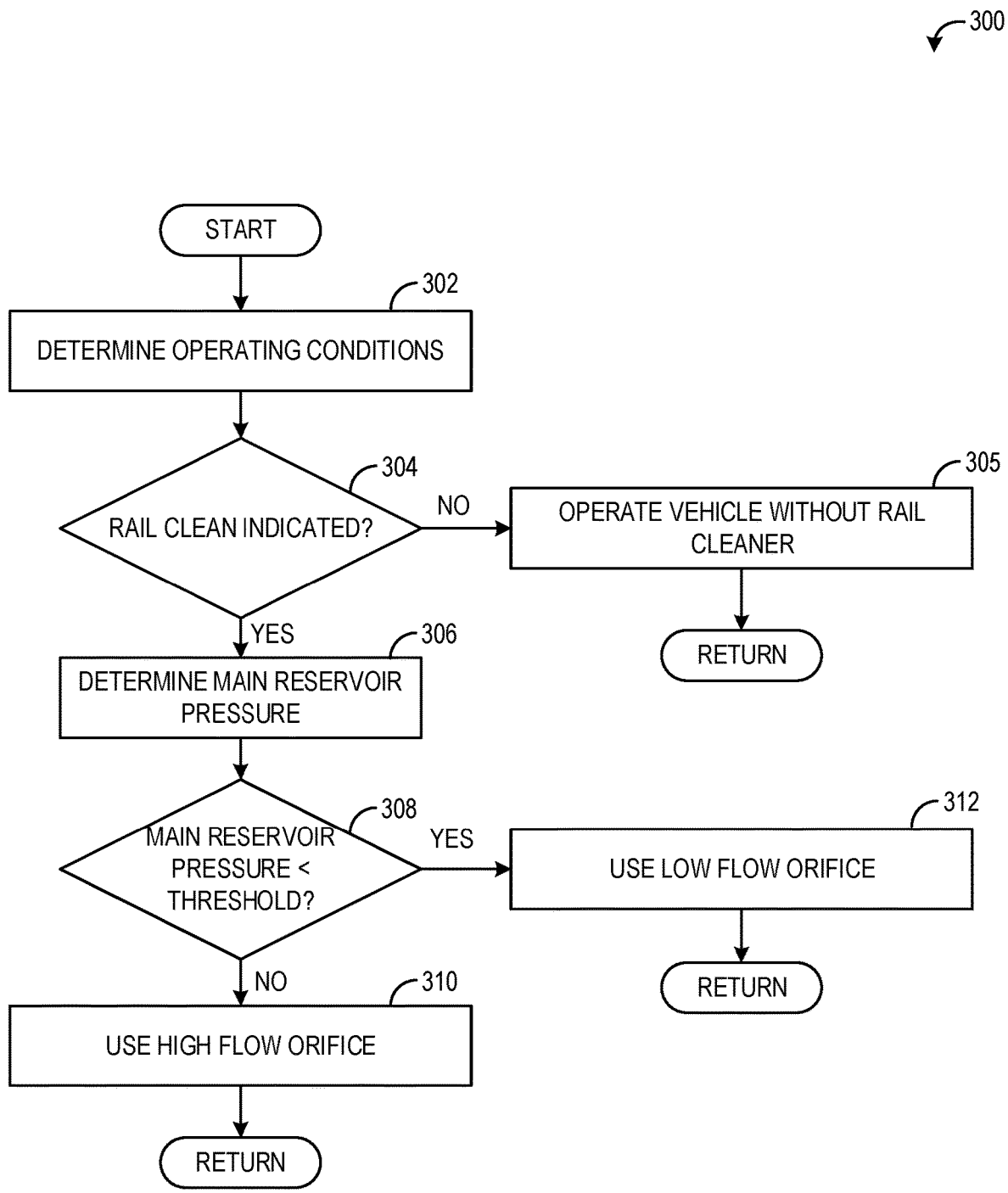
FIG. 3 is a flow chart illustrating a method for operating a continuous flow tractive effort system.

Turning now to FIG. 3, a method 300 for operating a continuous flow tractive effort system is illustrated. This method and other methods described herein may be executed by a controller having one or more processors according to non-transitory instructions stored in memory and in conjunction with a tractive effort system, such as the electronic controller and the tractive effort system described with reference to FIGS. 1 and 2. The controller may employ various actuators of the vehicle system to adjust vehicle system operation, according to the methods described below.

At step 302, the method may determine one or more operating conditions. Suitable determined operating condition may include one or more vehicle operating conditions. These vehicle operating conditions may include engine speed, vehicle speed, engine load, wheel slip, tractive effort, auxiliary load, battery state of charge, catenary voltage availability, and/or other like conditions. The determined operating condition may environmental operating conditions. These environmental operating conditions may include travel surface conditions and ambient conditions. Travel surface conditions may include surface grade, surface curvature, surface health, the presence of debris, and the like. Environmental conditions may include ambient temperature, pressure, humidity, precipitation, air quality, and the like. The determined operating condition may be based at least in part on output from on-board sensors such as surface debris and/or wheel slippage sensors and/or from information received from a remote system, such as a dispatch center or GPS unit (e.g., ambient temperature, upcoming surface conditions).

At step 304, the method determines if a Surface Cleaning operation (referred to as "Surface Clean Operation") is desired, needed, and/or indicated. In one example, Surface Clean Operation may be indicated based on one or more operating conditions such as a detection of limited tractive effort by surface conditions such as water, ice, or other debris on the surface. In one example, the Surface Clean Operation may be responsive to ambient temperature being below a threshold temperature, responsive to moisture on the surface being above a threshold level (e.g., when it is raining or snowing), and/or responsive to the surface grade being greater than a threshold grade. In one example, Surface Clean Operation may be indicated in response to reduced tractive effort below a threshold value. In another example, Surface Clean Operation may be indicated responsive to wheel slip greater than a threshold slip value. In one example, the operating condition may be the presence of surface moisture.

If Surface Clean Operation is not indicated, for example if desired tractive effort is being met, the method proceeds to step 305. At step 305, the method includes to operating the vehicle without Surface Clean Operation. This may include not flowing compressed gas through either orifice. For example, this may include closing (or determining closure of) both of the two parallel valves, decoupling the nozzle/passage of the tractive effort system and the air source. The method then returns.

If Surface Clean Operation is indicated, for example if desired tractive effort is not being met due to lowered surface friction, the method proceeds to step 306. Following the Surface Clean Operation indication, the method includes determining which orifice to use based on one or more conditions. The Surface Clean Operation may include opening one of two parallel valves to flow compressed air through one of two orifices: a first, higher velocity, high flow orifice, or a second, lower velocity, low flow orifice. In one example, the orifice size used may depend on the pressure of compressed air in the main reservoir. Thus, at step 306, the method includes checking the pressure in the main reservoir. In one example, a pressure sensor coupled the main reservoir detects a pressure in the main reservoir and signals the pressure to the controller.

At step 308, the method includes comparing the main reservoir pressure to a threshold pressure. In one example, the pressure threshold may be a preset (e.g., calibratable) non-zero pressure threshold value. In one example, the pressure threshold may be calibrated to maintain brake pressure above a brake pressure limit of the system (e.g., based on brake testing) and simultaneously provide high flow compressed air to the continuous flow tractive effort system. In one example, the first condition determining the use of the high flow orifice may include main reservoir pressure greater than the threshold pressure, e.g., a higher compressed air storage pressure. In another example, the second condition determining the use of the low flow orifice may include the main reservoir pressure less than the threshold pressure, e.g., a lower compressed air storage pressure. If the pressure estimate is less than the threshold pressure, the method continues to step 312.

At step 312, the method includes using the low flow orifice to supply the air stream to the surface via the nozzle of the tractive effort system. This may include establishing a fluidic coupling between the nozzle/passage of the continuous flow tractive effort system and the air source. In an example, establishing fluidic coupling may include opening the second solenoid valve coupled between the air source and nozzle while closing (or determining closure of) the first solenoid valve. Use of the low flow orifice constricts the flow of compressed air from the main reservoir to the nozzle, enabling Surface Cleaning under main reservoir low pressure conditions. In some examples, use of the low flow orifice may allow one or more compressors of the main reservoir pressure to load, enabling main reservoir pressure to increase above the threshold value. The method may then return to an earlier step.

Returning to step 308, if the main reservoir pressure is not less than the threshold pressure, the method continues to step 310. At step 310, the method includes using the high flow orifice to supply the air stream to the surface via the nozzle of the continuous flow tractive effort system. This may include establishing a fluidic coupling between the nozzle/passage of the tractive effort system and the air source by opening the first solenoid valve coupled between the air source and nozzle while closing and closing (or determining closure of) the second solenoid valve. Use of the high flow orifice may maximize compressed air flow for Surface Cleaning. The method then returns.

The method described above enables use of Surface Cleaning functionality. This functionality may be provided in an uninterrupted manner, and may be provided even during conditions of lower compressed air storage pressure in the main reservoir. By monitoring the pressure in the main reservoir, control may be achieved using a stable signal indicating overall outflow, providing adhesion benefit and tractive effort on-demand when ambient weather and/or other conditions indicate.

In an example, a system utilizing compressed air from the main reservoir on-board a locomotive may cause the pressure within the main reservoir to suddenly reduce substantially, e.g., drop, when the system is enabled. This may be a direct result of compressed air being drawn from the reservoir faster than the air compressor can replace it. As the tractive effort systems described herein may be large consumers of compressed air, enablement of the system may result in a large, sudden, and detectable pressure reducing events in the main reservoir. As the pressure in the main reservoir drops, the air compressor may be activated to replace the compressed air within the main reservoir. In some examples, such as conditions of substantial leakage in the air system, pressure drops may result in frequent switching between the low flow and high flow orifices. An additional or alternative approach may include active estimation of a leakage rate of air in the system. In such an approach, a decision between using the first orifice and the second orifice may be based on an estimation of leakage in the system. The method 400 of FIG. 4 describes an embodiment using a model of compressed gas storage and usage to estimate an amount of compressed air leakage using feedback of the sensors in the system (e.g., pressure, flow), such as described with reference to FIGS. 1 and 2. In an example, the controller may determine in advance of Surface Cleaning activation which orifice to use, such as the first and second orifices of the continuous flow tractive effort system described in FIGS. 1 and 2. In one example, advance determination may reduce incidence of switching to the smaller orifice from the larger due to pressure reducing in the system. In an example, the system may be more proactive by estimating leakage during various operating conditions using the model, anticipating which orifice to use based on the conditions, and thus tractive system use during high compressor demand and leakage scenarios is achieved.

At step 402, the method includes determining operating conditions. As above, determined operating conditions may include vehicle operating conditions such as engine speed, vehicle speed, engine load, wheel slip, tractive effort, and/or other suitable conditions. Determined operating conditions may include travel surface conditions, such as surface grade, surface curvature, and ambient conditions such as ambient temperature. The operating conditions may be determined based on output from on-board sensors such as surface debris and/or wheel slippage sensors and/or from information received from a remote system, such as a dispatch center or GPS unit (e.g., ambient temperature, upcoming surface conditions). Determined operating conditions may further include a status of the compressor, such as whether the compressor is running or not. An operating condition may include a status of one or more parallel air using systems (e.g., consumer systems). An operating condition may include input from sensors, such as sensors estimating parameters of the model.

At step 404, the method determines if Surface Clean Operation is indicated. Surface Clean Operation may be indicated based on one or more operating conditions such as a detection of limited tractive effort by surface conditions such as water, ice, or other debris on the surface. In one example, the Surface Clean Operation may be indicated responsive to ambient temperature being below a threshold temperature, responsive to moisture on the surface being above a threshold level (e.g., when it is raining or snowing), and/or responsive to the surface grade being greater than a threshold grade. In one example, Surface Clean Operation may be indicated in response to reduced tractive effort below a threshold. In another example, Surface Clean Operation may be indicated responsive to wheel slip greater than a threshold slip. In one example, the operating condition may be the presence of surface moisture.

If Surface Clean Operation is not indicated, for example if desired tractive effort is being met, the method proceeds to step 405. At step 405, the method includes to operating the vehicle without Surface Clean Operation. This may include not flowing compressed gas through either orifice or preventing the flow of compressed gas to or through the orifice. For example, this may include closing (or determining closure of) both of the two parallel valves, decoupling the nozzle/passage of the tractive effort system and the air source. The method then returns.

Returning to step 404, if Surface Clean Operation is indicated, for example if desired tractive effort is not being met due to lowered surface friction, the method proceeds to step 406. Following the Surface Clean Operation indication, the method includes determining which orifice to use. In one example, orifice determination may be based on a condition of an estimate of compressed air leakage. Thus, at step 406, the method includes estimating the compressed leakage amount in the system. In one example, one or more sensors may monitor air pressure and/or air flow in the systems of the vehicle that use compressed air from the main reservoir (e.g., air brakes, air horn, and tractive effort system). Feedback from the one or more sensors may be compared to the compressed gas storage and usage model. In one example, the leakage estimate may be an absolute percent difference (e.g., deviation) from the model.

At step 408, the method includes comparing the leakage estimate to a threshold leakage. In one example, the threshold leakage may be a preset non-zero pressure threshold value. In one example, the threshold leakage may be an absolute percent difference (e.g., deviation) from the model. In one example, the first condition determining the use of the high flow orifice may include a leakage estimate less than the threshold leakage, e.g., a lower compressed air leakage amount. In another example, the second condition determining the use of the low flow orifice may include a leakage estimate greater than the threshold leakage, e.g., a higher compressed air leakage amount. If the leakage estimate is greater than the threshold leakage, the method continues to step 412.

At step 412, the method includes using the low flow orifice to supply the air stream to the surface via the nozzle of the continuous flow tractive effort system. This may include establishing a fluidic coupling between the nozzle/passage of the continuous flow tractive effort system and the air source. In an example, establishing fluidic coupling may include opening the second solenoid valve coupled between the air source and nozzle while closing (or determining closure of) the first solenoid valve. Use of the low flow orifice constricts the flow of compressed air from the main reservoir to the nozzle. The method then returns.

Returning to step 408, if the leakage estimate is not greater than the threshold leakage, the method continues to step 410. At step 410, the method includes using the high flow orifice to supply the air stream to the surface via the nozzle of the continuous flow tractive effort system. This may include establishing a fluidic coupling between the nozzle/passage of the continuous flow tractive effort system and the air source by opening the first solenoid valve coupled between the air source and nozzle while closing and/or determining closure of the second solenoid valve. Use of the high flow orifice may maximize compressed air flow for Surface Cleaning. The method then returns.

In some examples, operating the first and second orifices based on an estimate of leakage in the system may minimize orifice-switching events (e.g., back and forth from the high flow orifice to low flow orifice) due to pressure reducing by estimating pressure loss potential due to system leakage. In some examples, use of the low flow orifice may enable maintenance of main reservoir air pressure (e.g., above a threshold pressure) under air system leakage conditions. In some examples, maintaining main reservoir pressure may enable simultaneous use of compressed air by various systems of the vehicle and reduce incidences where systems may be shut off due to main reservoir pressure reducing below a threshold pressure. In yet another embodiment, the methods described herein may work together. In such an embodiment, orifice use may be determined by a leakage flow estimate and a pressure threshold may be set at a lower level as redundant method to ensure sufficient air is available to brakes, etc. In this way, a continuous flow tractive effort system may provide on-demand adhesion benefit, while ensuring main reservoir pressure remains sufficiently high to support other systems.

In one example, the methods described herein may include flowing compressed gas to vehicle brakes for the duration of the operation of the continuous flow tractive effort system. In such an example, uninterrupted compressed air may be provided to the brakes until tractive effort meets a desired tractive effort for a threshold duration, e.g., a duration of time. In this way, the vehicle brakes and the tractive effort system may operate in combination to provide traction.

Figure 5:
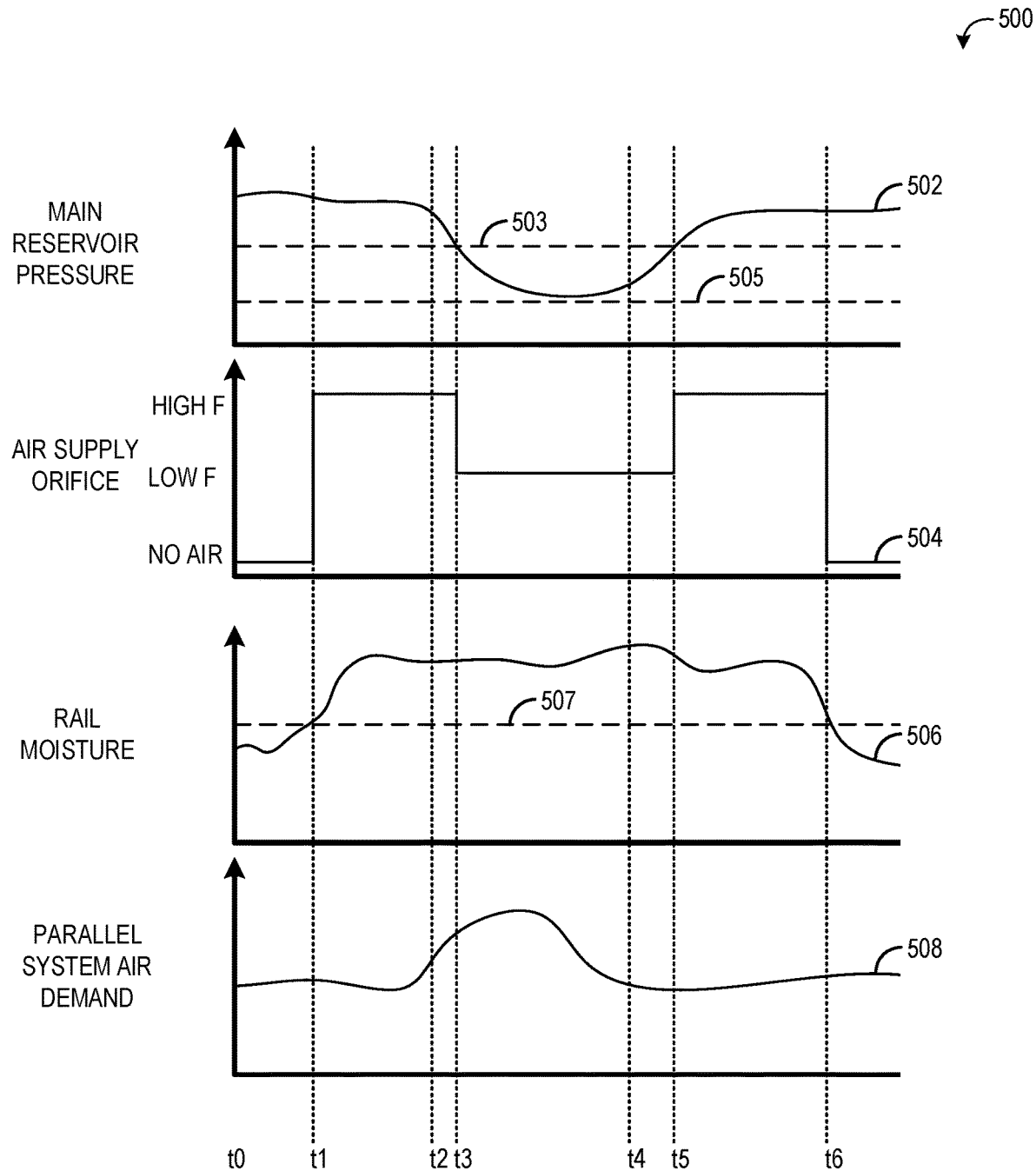
FIG. 5 is a timing diagram of a prophetic example use of the method of FIG. 3.

Referring now to FIG. 5, a timeline 500 is depicted showing an example prophetic operation of a continuous flow tractive effort system of a vehicle, such as a locomotive, to clean a surface on which the vehicle is traveling, such as a surface of a rail, based on the method of FIG. 3. The horizontal axis (x-axis) denotes time and the vertical markers t1 through t6 identify reference times during the example prophetic operation. The following parameters are plotted as operating conditions to be read by a controller of the vehicle system during the example prophetic operation: main reservoir pressure 502, surface moisture 506, and parallel system air demand 508. A parameter for air supply orifice 504 indicates activation of a continuous flow system coupling the main reservoir air supply to a nozzle of a tractive effort system to produce an air stream to clean the rail. In one example, the continuous flow tractive effort system and the main reservoir may the same or similar as described in FIGS. 1 and 2. Air supply orifice states include an activation of one of a first solenoid valve controlling a high velocity, high flow (high F) orifice, or a second solenoid valve controlling a low velocity, low flow (low F) orifice, or both valves closed (No Air). The plots 502, 506, and 508 increase upwards along the y-axis.

In one embodiment, the method to clean a surface may indicate Surface Cleaning following detection of moisture on the surface in excess of a threshold value. In one embodiment, the moisture value may be detected by an optical sensor. Dashed line 507 denotes the threshold moisture (e.g., surface more than 50% wet). In one embodiment, the method to clean the rail may determine the air supply orifice based on a compressed air storage pressure, such as a main reservoir pressure. Dashed line 503 denotes the main reservoir first threshold pressure (e.g., 100 pounds per square inch (psi)). Lower compressed air storage pressure, e.g., less than the first threshold pressure, may determine use of the low flow orifice. Dashed line 505 denotes a main reservoir minimum pressure above the brake pressure limit of the system (e.g., 55 psi). In an example, one or more compressed air consuming systems of the vehicle may be shut off if pressure in the main reservoir is determined less than the minimum pressure.

At t0, the main reservoir pressure (e.g., 175 psi) is above the first threshold pressure. Surface moisture (e.g., surface is 30% wet) is below the threshold moisture. Therefore, the continuous flow tractive effort system is not providing an air stream to clean the rail. The first solenoid valve controlling the high flow orifice and the second solenoid valve controlling the low flow orifice are in a closed state. Parallel systems, such as an air horn, are demanding a moderate level of compressed air from the main reservoir.

From t0 to t, the optical sensor detects increasing surface moisture. The surface moisture remains below the threshold moisture. Therefore, the conditions are not met indicating Surface Clean Operation and the continuous flow tractive effort system is not flowing compressed gas through either orifice. Parallel system demand remains moderate and relatively constant.

At t1, the optical sensor signals surface moisture increasing above the threshold moisture (e.g., surface is more than 50% wet). Thus, the condition indicating Surface Clean Operation is met. The pressure sensor signals main reservoir pressure greater than the first threshold pressure (e.g., 175 psi). The first solenoid valve is opened, coupling the air supply to the nozzle via the high flow orifice. A stream of high velocity air is directed to the surface of the rail. Parallel system demand remains moderate.

From t1 to t2, surface moisture increases and remains above the threshold moisture. Therefore, the conditions for Surface Cleaning continue to be indicated. Main reservoir pressure is relatively constant. The main reservoir pressure remains above the pressure threshold and use of the high flow orifice continues. Parallel system air demand increases due to use of a sanding system and air horn as the timeline approaches t2.

At t2, main reservoir pressure is above the pressure threshold and a small brake pipe leakage contributes to pressure decreasing in the main reservoir. Surface moisture remains above the threshold value and the high flow orifice is in use.

From t2 to t3, main reservoir pressure decreases due to increased parallel system demand and the small brake pipe leakage. The high flow orifice is in use as the surface moisture remains above the threshold value.

At t3, the optical sensor continues to detect surface moisture in excess of the threshold moisture. The main reservoir pressure falls below the first threshold pressure indicating use of the low flow orifice (e.g., 100 psi). The first solenoid valve is closed, decoupling the air supply to the nozzle via the high flow orifice. The second solenoid valve is opened, coupling the air supply to the nozzle via the low flow orifice. A low velocity stream of air is directed to the surface of the rail.

From t3 to t4, Surface Cleaning continues using the low flow orifice. Parallel system air demand increases and then decreases as the timeline approaches t4. Main reservoir pressure decreases at first and then increases as the timeline approaches t4 due to deactivation of the sanding system. Use of the low flow orifice prevents the main reservoir pressure from falling below the minimum pressure above the brake pressure limit of the system.

From t4 to t5, the main reservoir pressure increases in response to decreased parallel system demand. The tractive effort system continues to use the low flow orifice to clean the rail due to surface moisture remaining above the threshold moisture.

At t5, the pressure sensor signals main reservoir pressure increasing above the first threshold pressure (e.g., 100 psi). The second solenoid valve is closed, decoupling the air supply to the nozzle via the low flow orifice. The first solenoid valve is opened, coupling the air supply to the nozzle via the high flow orifice. A high velocity stream of air is directed to the surface of the rail.

From t5 to t6, parallel system demand remains moderate and relatively constant. Main reservoir pressure remains relatively constant and above the first threshold pressure. Surface Cleaning continues to be indicated due to surface moisture above the threshold moisture. Surface moisture decreases as time approaches t6.

At t6, the optical sensor detects the surface moisture below the threshold moisture (e.g., surface less than 50% wet). Therefore, the one or more conditions indicating Surface Clean Operation are no longer met. Thus, the first solenoid valve is closed, decoupling the air supply to the nozzle. The continuous flow tractive effort system is no longer providing a stream of air to clean the rail.

Figure 4:
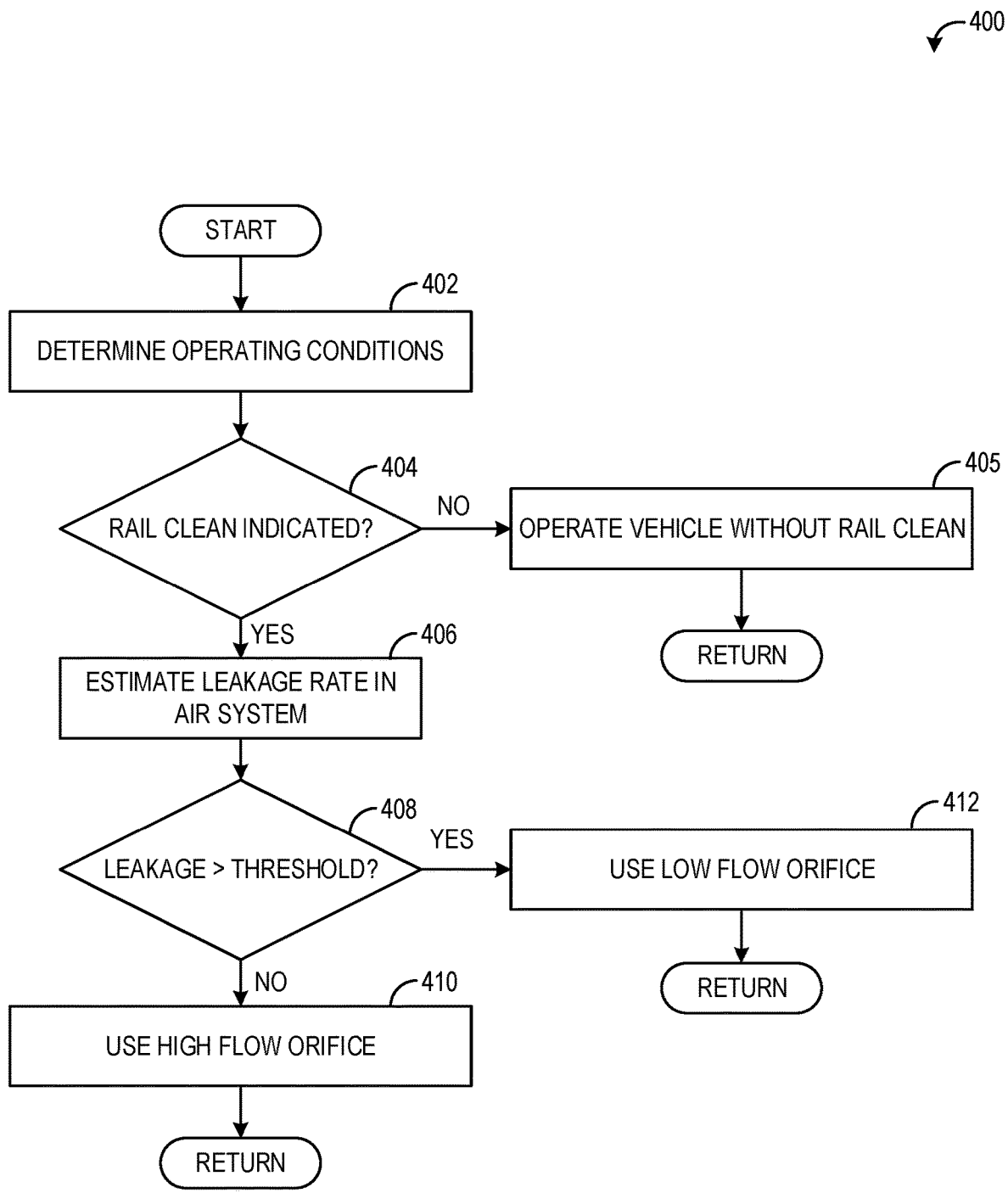
FIG. 4 is a flow chart illustrating a method for operating a continuous flow tractive effort system.
Figure 6:
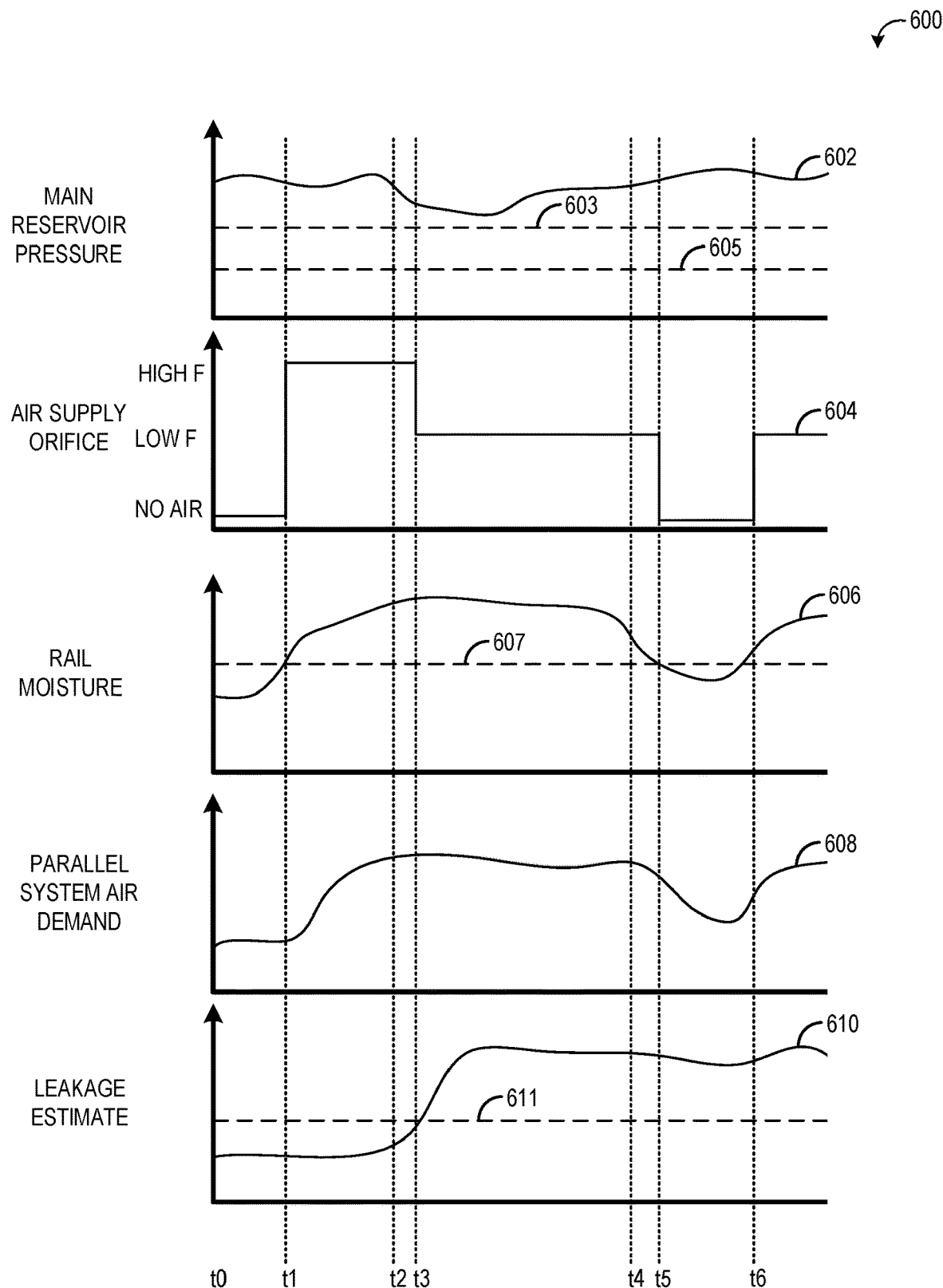
FIG. 6 is a timing diagram of a prophetic example use of the method of FIG. 4.

Referring now to FIG. 6, a timeline 600 is depicted showing an example prophetic operation of a vehicle system, such as a locomotive, to clean a surface on which the vehicle is traveling, such as a surface of a rail, based on the method of FIG. 4. The horizontal axis (x-axis) denotes time and the vertical markers t1 through t6 identify reference times during the example prophetic operation. The following parameters are plotted as operating conditions to be read by a controller of the vehicle system during the example prophetic operation: main reservoir pressure 602, surface moisture 606, parallel system air demand 608, and leakage estimate 610. A parameter for air supply orifice 604 indicates activation of a continuous flow system coupling the main reservoir air supply to a nozzle of a tractive effort system to produce an air stream to clean the rail. In one example, the continuous flow tractive effort system and the main reservoir may the same or similar as described in FIGS. 1 and 2. Air supply orifice states include an activation of one of a first solenoid valve controlling a high velocity, high flow (high F) orifice, or a second solenoid valve controlling a low velocity, low flow (low F) orifice, or both valves closed (No Air). The plots 602, 606, 608, and 610 increase upwards along the y-axis.

In one embodiment, the method to clean a rail may indicate Surface Cleaning following detection of moisture on the surface of the rail in excess of a threshold value, such as detected by an optical sensor. Dashed line 607 denotes the threshold moisture (e.g., surface more than 50% wet). In one embodiment, the method to clean the rail may determine the air supply orifice based on a real-time estimate of compressed air leakage. In one embodiment, the leakage estimate may be determined by comparing a model of compressed gas storage and usage to feedback of measured pressure at one or more pressure sensors in the system. Dashed line 611 denotes a threshold leakage. In one example, the leakage threshold and leakage estimates may be an absolute percent difference from the model. For example, the threshold leakage may be 15% (e.g., from the model). Higher compressed air leakage amount, e.g., in excess of the threshold leakage, may determine use of the low flow orifice. For reference, dashed line 603 denotes the main reservoir first threshold pressure included in FIG. 5 (e.g., 100 psi). However, the first pressure threshold does not determine orifice use in this example timeline. Dashed line 605 denotes a main reservoir minimum pressure above the brake pressure limit of the system (e.g., 55 psi). In an example, one or more compressed air consuming systems of the vehicle may be shut off if pressure in the main reservoir is determined less than the minimum pressure.

At t0, the leakage estimate is below the threshold leakage (e.g., 5%). Surface moisture is below the threshold moisture (e.g., surface is 30% wet). Therefore, Surface Cleaning is not indicated. The first solenoid valve controlling the high flow orifice and the second solenoid valve controlling the low flow orifice are in a closed state. Compressed gas is not flowing through either orifice. Other systems, such as an air horn, are demanding a moderate level of compressed air from the air compressor.

From t0 to t, the optical sensor detects increasing surface moisture. The moisture remains below the threshold moisture and therefore the conditions are not met indicating Surface Clean Operation. The first and second solenoid valves of the continuous flow tractive effort system remain closed. Parallel system demand remains moderate and relatively constant.

At t1, the optical sensor signals surface moisture increasing above the threshold moisture (e.g., surface is more than 50% wet). Thus, the one or more of the conditions indicating Surface Clean Operation is met. The leakage estimate is less than the threshold leakage (e.g., 5%). The first solenoid valve is opened, coupling the air supply to the nozzle via the high flow orifice. A high velocity stream of air is directed to the surface of the rail. Parallel system demand remains moderate.

From t1 to t2, surface moisture increases, and remains above the threshold moisture. Therefore, the conditions for Surface Cleaning continue to be indicated. Parallel system air demand increases due to use of a sanding system and air horn. Main reservoir pressure is relatively constant, remaining above the pressure threshold (e.g., 160 psi).

At t2, one or more pressure sensors in the system detect increasing leakage in the air system due to a valve leak in a brake pipe. A pressure reading in the system is compared to the model to estimate a compressed air leakage amount. The leakage estimate remains less than the threshold leakage, indicating continued use of the high flow orifice (e.g., 7%).

From t2 to t3, the main reservoir pressure decreases due to the brake pipe leakage. Surface Cleaning continues to be indicated due to surface moisture greater than the threshold moisture (e.g., 80% wet). The leakage estimate remains below the threshold leakage, increasing as the timeline approaches t3.

At t3, the leakage estimate crosses the leakage estimate threshold (e.g., 15%), indicating use of the low flow orifice. The first solenoid valve is closed, decoupling the air supply to the nozzle via the high flow orifice. The second solenoid valve is opened, coupling the air supply to the nozzle via the low flow orifice. A low velocity stream of air is directed to the surface of the rail. Main reservoir pressure remains above the first threshold pressure (e.g., 130 psi).

From t3 to t4, Surface Cleaning continues using the low flow orifice. Parallel system air demand remains relatively constant. Main reservoir pressure decreases at first and then increases as time approaches t4. Use of the low flow orifice minimizes demand on the main reservoir from the tractive effort system, preventing pressure from falling below the first threshold value. Main reservoir pressure is maintained well above the minimum brake pressure limit of the system.

From t4 to t5, surface moisture decreases, remaining above the threshold value such that Surface Cleaning continues to be indicated. Main reservoir pressure remains relatively constant with continued use of the low flow orifice (e.g., 160 psi).

At t5, the optical sensor detects the surface moisture below the threshold moisture (e.g., surface less than 50% wet). Therefore, the one or more conditions activating rail clean are no longer met. Thus, the second solenoid valve is closed, decoupling the air supply to the nozzle. The continuous flow tractive effort system is no longer providing a stream of air to clean the rail.

From t5 to t6, main reservoir pressure increases slightly in response to decreased parallel system demand (e.g., 170 psi). As the timeline approaches t6, surface moisture increases. At t6, the optical sensor detects surface moisture greater than the moisture threshold (e.g., more than 50% wet). A pressure reading in the system is compared to the model to estimate a compressed air leakage amount. The leakage estimate remains more the threshold leakage, indicating use of the low flow orifice. The controller opens the second solenoid valve, coupling the air supply to the nozzle via the low flow orifice. A stream of lower velocity air is directed to the surface of the rail.

After t6, main reservoir pressure remains relatively constant and above the first threshold pressure (e.g., 175 psi).

In this way, the continuous flow tractive effort system may provide a stream of air that impacts the surface on which the vehicle to dislodge water, ice, or other debris from the surface to increase traction on-demand. The efficiency and adhesion performance of the vehicle may be fulfilled throughout an entire trip, for example, during leakage events, and/or while parallel systems demand compressed air. A technical effect of the continuous flow tractive effort system is providing the customer with more opportunities to define additional train set ups and/or to increase gross train weight.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operating a vehicle, comprising:
   flowing compressed gas selectively through distinct orifice sizes in response to a determined operating condition of the vehicle, and thereby to create a stream of gas that impacts a surface of a route adjacent to a wheel of the vehicle,
   wherein flowing the compressed gas comprises flowing the compressed gas from a compressed gas storage tank through a delivery system coupling the storage tank to a nozzle, wherein the delivery system comprises a parallel path diverging downstream of the compressed gas storage tank and converging upstream of the nozzle, the parallel path including a first path and a second path.

2. The method of claim 1, further comprising delivering the stream of gas to a location that is upstream relative to a direction of travel of the vehicle wheel of the vehicle via the nozzle.

3. The method of claim 2, further comprising selecting a mode of operation from a first mode in which the stream of gas is delivered through a first orifice disposed in the first path and not a second orifice disposed in the second path during a first condition and a second mode in which the stream of gas is delivered through the second orifice and not the first orifice during a second condition that differs from the first condition.

4. The method of claim 3, wherein the first condition comprises first compressed air storage pressure and the first orifice comprises a first orifice size, and the second condition comprises a second compressed air storage pressure and the second orifice comprises a second orifice size,
   wherein the first compressed air storage pressure is greater than the second compressed air storage pressure, and
   wherein the first orifice size is greater than the second orifice size.

5. The method of claim 3, wherein the first condition comprises a first compressed air storage leakage amount and the first orifice comprises a first orifice size, and wherein the second condition comprises a second compressed air leakage amount and the second orifice comprises a second orifice size,
   wherein the first compressed air storage leakage amount is smaller than the second compressed air storage leakage amount, and
   wherein the first orifice size is greater than the second orifice size.

6. The method of claim 5, further comprising estimating the compressed air leakage amount based at least in part on a model of compressed gas storage and usage in the vehicle and feedback based on a storage pressure.

7. The method of claim 3, further comprising actuating a first solenoid disposed in the first path to open and a second solenoid disposed in the second path to close during the first condition, and actuating the first solenoid to close and the second solenoid to open during the second, different, condition.

8. The method of claim 1, further comprising preventing or reducing the flow of compressed gas through either orifice during a second operating condition of the vehicle.

9. The method of claim 1, further comprising determining a surface moisture value for the surface as a component of the operating condition.

10. The method of claim 1, further comprising determining a storage pressure value as a component of the operating condition.

11. The method of claim 1, further comprising flowing at least a portion of the compressed gas from a storage vessel to brakes of the vehicle.

12. A method of operating a vehicle, comprising:
    monitoring vehicle tractive effort to identify a reduced tractive effort that is below a threshold value;
    determining an operating condition of the vehicle; and
    responding to an identified reduced tractive effort by requesting Surface Cleaning in which compressed air is directed through a delivery system coupling a compressed air storage tank to a nozzle, the delivery system comprising a parallel path diverging downstream of the compressed air storage tank and converging upstream of the nozzle wherein the parallel path comprises a first path and a second path, wherein the compressed air is selectively directed through one or both of a first orifice disposed in the first path and a second orifice disposed in the second path toward a location on a route surface that is upstream of a vehicle wheel based at least in part on the determined operating condition of the vehicle.

13. The method of claim 12, further comprising selectively delivering compressed air through the first orifice and not the second orifice to the nozzle during a first condition, and delivering through the second orifice and not the first orifice during a second condition that differs than the first condition.

14. The method of claim 13, wherein the first condition comprises a first compressed air storage pressure and the first orifice comprises a first orifice size, and the second condition comprises a second compressed air storage pressure and the second orifice comprises a second orifice size, wherein the first compressed air storage pressure is greater than the second compressed air storage pressure, and wherein the first orifice size is greater than the second orifice size.

15. The method of claim 13, wherein the first condition comprises a first compressed air leakage amount and the first orifice comprises a first orifice size, and the second condition comprises a second compressed air leakage amount and the second orifice comprises a second orifice size, wherein the first compressed air leakage amount is less than the second compressed air leakage amount, and wherein the first orifice size is greater than the second orifice size.

16. The method of claim 15, further comprising estimating the compressed air leakage amount based at least in part on a model of compressed gas storage and usage in the vehicle and feedback based on a storage pressure.

17. A system, comprising:
a compressed gas storage tank; and
a delivery system coupling the storage tank to a nozzle, the delivery system including a parallel path diverging downstream of the compressed gas storage tank and converging upstream of the nozzle, the parallel path including a first path with a first orifice and first solenoid, and a second path including a second orifice and second solenoid.

18. The system of claim 17, further comprising a controller having one or more processors with instructions stored therein configured to cause the first solenoid to open and the second solenoid to close during a first condition, and the first solenoid to close and the second solenoid to open during a second condition.

19. The system of claim 18, further comprising a vehicle configured to support the storage tank, the delivery system and the controller, and the nozzle is configured to direct a stream of gas that is supplied from the storage tank to a surface proximate to a wheel of the vehicle, and thereby to change a friction coefficient of the surface relative to the wheel responsive to the wheel contacting the surface.

20. The system of claim 19, wherein the vehicle is a rail vehicle, the wheel is a steel wheel, and the surface is a portion of a steel rail upstream of the wheel in the direction of travel of the vehicle.

* * * * *